Patented May 3, 1932

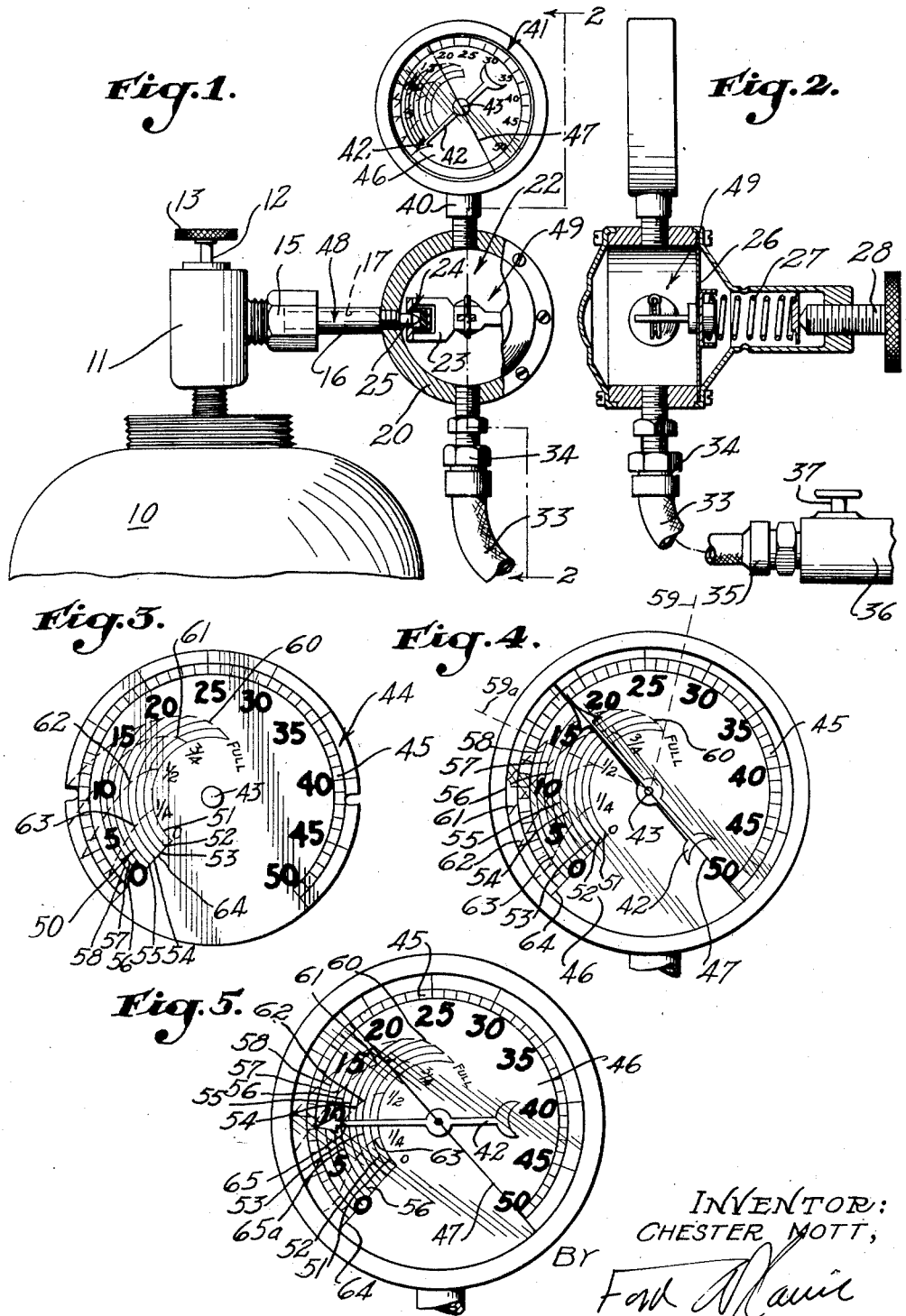

1,856,079

UNITED STATES PATENT OFFICE

CHESTER MOTT, OF DENVER, COLORADO, ASSIGNOR, BY MESNE ASSIGNMENTS, TO UNION CARBIDE AND CARBON RESEARCH LABORATORIES, INC., A CORPORATION OF NEW YORK

METHOD OF AND APPARATUS FOR DETERMINING THE FLUID CONTENTS OF CYLINDERS

Application filed December 5, 1927. Serial No. 237,713.

My invention relates to pressure indicating devices, and more particularly to a method of and apparatus for determining the amount of gas stored under pressure in a container.

In order that the purposes and advantages of my invention may be understood, I shall refer to the oxyacetylene welding industry in which my invention may be advantageously utilized. The gases which such oxyacetylene torches burn are usually drawn from suitable containers, the gases being stored therein under high pressure. This is particularly true of the oxygen container, which holds gas under pressures of several hundred pounds per square inch. These gas containers each have a high pressure gage connected thereto which gives a measure of the pressure in the container and of the cubical gas content thereof. A pressure regulator is utilized for supplying the gas at a relatively low pressure to the torch which is connected thereto by means of a suitable hose. The pressure of the gas supplied to the torch is regulated and kept constant by the regulator, and this pressure is indicated by a suitable low pressure gage.

The operator often desires to determine the amount of gas used on a single job. At present, the method used for determining the amount of gas used is by noting the change in reading of the high pressure gage and by proper calculation determining the fractional part of the contents used. I have found a method of determining the cubical gas content of a container without using the high pressure gage, so that it is possible to completely dispense with such a gage.

It is an object of my invention to provide a method of determining the cubical content of a container filled with gas at a high pressure by utilizing a low pressure gage.

I perform this method by utilizing the low pressure gage installed on the regulator. I have found it possible by providing a special dial on this low pressure gage to obtain a direct reading of fractional cubical content at any degree of charge of the container.

It is another object of my invention to provide a gage adapted to indicate the cubical content of a container.

A further object of my invention is to provide a gage adapted to directly indicate the fractional cubical content of a container without regard to the original degree of charge.

Further objects of my invention will be made evident hereinafter.

Referring to the drawings,—

Fig. 1 is a partial sectional view of a regulator valve incorporating the gage of my invention.

Fig. 2 is a sectional view taken on the line 2—2 of Fig. 1.

Fig. 3 is a front view of the gage dial of my invention.

Figs. 4 and 5 illustrate two positions in the operation of the gage of my invention.

Referring particularly to Fig. 1, a gas container 10 has a valve body 11 secured to the top thereof. This valve body has an opening in which a container valve 12 operates. This container valve is controlled by a knurled head 13 and is adapted to regulate, or completely obstruct, the flow of gas from the container 10.

A suitable nipple 15 clamps a pipe 16 in tight relationship with the valve body 11. The pipe 16 has an opening 17 which communicates with the interior of the gas container 10 through the container valve 12.

Suitably attached to the outer end of the pipe 16 is a body 20 of a regulator 22. This regulator essentially comprises a bowed valve member 23 of a regulator valve 24, this member 23 being adapted to close a tip 25 formed on the end of the pipe 16. The valve member 23 is adapted to be directly actuated by a diaphragm 26 which is exposed to the gas pressure inside the body 20. The movement of this diaphragm 26 is in turn controlled by a spring 27, the amount of compression of this spring being determined by a regulator adjusting screw 28. In the form shown in Figs. 1 and 2, the valve member 23 is slightly bowed so that a movement of the diaphragm 26 to the left, as indicated in Fig. 2, will cause the valve member 23 to become more bowed and will allow the tip 25 to communicate with the interior of the body 20. So, also, when the diaphragm 26 is forced in an opposite direction, the valve member 23 will be caused to bear tightly against the tip 25 by straightening the bowed portion thereof. The movement of the diaphragm 26 is, of course, controlled both by the gas pressure in the body 20 and the amount of compression in the spring 27, this latter effect being variable by turning the regulator adjusting screw 28.

A hose 33 is attached by a suitable coupling 34 to the body 20 so as to communicate with the interior thereof. This hose 33 is also joined by a coupling 35 to a torch 36 of any well known design. The torch 36 has a torch needle valve 37 which is adapted to control the flow of gas from the hose 33 to the burner of the torch 36.

Screwed into the upper end of the body 20 is a shank 40 of a low pressure gage 41 incorporating novel features of my invention.

The gage 41 has a hand 42 pivoted at 43, this hand being connected to a suitable actuating mechanism in the gage 41 so that the position of the hand 42 relative to a dial 44 is determined by the pressure in the body 20. The hand 42 is adapted to rotate adjacent to an outer scale 45 of the dial 44, this scale being preferably calibrated to read in pounds per square inch. The hand 42 operates behind a glass 46 secured in a suitable rim. This rim may be turned on the body of the valve 41 and in so turning carries the glass 46 therewith. Suitably formed in the glass 46 is a line 47 extending diametrically thereacross. This line 47 is adapted to record any desired position of the hand 42.

The operation of my invention is as follows:

The torch 36 and the hose 33 are attached to the regulator 22, as previously described. The regulator 22 is then attached to the pipe 16 which, in turn, is connected to the container 10. The container valve 12 at this time is closed to prevent any escape of gas therefrom. The regulator adjusting screw is then unscrewed to a maximum outward position, thus putting no compressive stress on the spring 27 and allowing the regulator valve to be completely closed in a manner previously described. The torch needle valve is preferably open so as to insure that the interior of the body 20 is at atmospheric pressure. The container valve 12 is now momentarily opened and again closed. This allows a small volume of gas to escape from the container 10 into the pipe 16 where it is entrapped between the valves 12 and 24. The gas thus entrapped fills a primary chamber 48 which is composed of that portion of the opening 17 in the pipe 16 which is closed at one end by the container valve 12 and at the other end by the regulator valve 24. It should be clear that the gas thus entrapped in the primary chamber 48 is at a pressure equal to the pressure of the gas in the container 10. At this time the torch needle valve 37 is tightly closed and the regulator adjusting screw 28 is screwed inward, thus opening the regulator valve 24, allowing the gas entrapped in the primary chamber 48 to expand into a secondary chamber 49. This secondary chamber is bounded by the body 20, the mechanism of the gage 41, the hose 33, and that portion of the torch 36 between the torch needle valve 37 and the hose 33, and also includes the primary chamber 48. Inasmuch as the primary chamber 48 is much smaller in volume than the secondary chamber 49, it follows that the pressure in the secondary chamber will be materially lower than that in the primary chamber or in the gas container. In fact, the ratio of the pressure in the secondary chamber 49 with respect to the original pressure in the primary chamber 48 will be equal to the ratio of the volume of the primary chamber 48 with respect to the volume of the secondary chamber 49, assuming that the temperature remains constant and that no leakage occurs. This pressure in the secondary chamber 49 is indicated by the gage 41.

When the hand 42 of the gage 41 reaches its maximum position, after the foregoing primary test has been completed, the line 47 on the glass 46 is turned so as to lie directly along the hand 42 in a position which is clearly shown in Fig. 4. The line 47 is allowed to remain unmolested until the gas container 10 is completely empty, or until the regulator 22 is removed from this particular container. The torch 36 is now ready for use and the operator needs only to adjust the torch needle valve 37 and the regulator adjusting screw 28 to obtain the desired pressure applied to the torch 36, this pressure being relatively low for welding, but being relatively high for cutting. The hand 42, however, indicates the exact pressure in the regulator body 20 at all times, and the spring 27, together with the diaphragm 26, accurately controls this pressure to maintain it constant.

After a certain amount of use, it is often desired to perform a secondary test to determine the fractional amount of gas remaining in the gas container 10. In accomplishing this result, the operator closes the container valve 12 and the regulator valve 24 and opens the torch needle valve 37, thus allowing the interior of the regulator body 20 to again be at atmospheric pressure. At this time the container valve 12 is instantaneously opened in a manner previously described, thus entrapping a quantity of gas in the primary chamber 48 at a pressure equal to the pressure in the gas container 10. The torch needle valve 37 is now closed and the regulator adjusting screw is screwed inward until the hand 42 reaches a maximum position, at which time the valve 24 is opened. Inasmuch as the gas in the container 10 is at a lower pressure than at the time the previous reading was taken, less gas will be stored in the primary chamber 48, and thus less gas will expand into the secondary chamber 49. The hand 42 will, therefore, read a lesser pressure than that indicated by the line 47 which was made to coincide with the hand when in its maximum position at the first reading. If, as indicated in Fig. 5, the hand now reads a pressure of nine pounds per square inch, and if, as indicated in Fig. 4, the hand previously recorded a pressure of eighteen pounds per square inch, it will be apparent that the pressure in the gas container 10 has been reduced one-half. This, of course, indicates that the amount of gas remaining in the container is one-half of that stored therein originally. The operator may arrive at this result by reducing to lowest terms the fraction obtained when the new reading is placed in the numerator and the old reading is placed in the denominator. Such a procedure is impractical, especially when employing labor unfamiliar with fractions and the process of reducing such fractions to their lowest terms.

For the purpose of simplifying the determination of the exact fractional content of the container 10, I provide indicia 50 on the face of the dial 44, these indicia being clearly apparent in Figs. 1, 3, 4, and 5. These indicia are composed of content-indicating lines 51 to 58 inclusive, these content-indicating lines being concentric with the pivot point 43 of the hand 42. These content-indicating lines are preferably equally spaced from each other, but such an arrangement is not necessary to obtain a correct determination of the fractional content of the gas container 10.

It will, of course, be clear that the maximum pressure in the secondary chamber 49 when the primary test on a container is made, will vary with the degree of charge of the container. This pressure recorded is also dependent upon the volume of the secondary chamber 49 which, in turn, is proportional to the volume of the hose 33. Inasmuch as it is often desired to connect different lengths of hose to the regulator 22, thus changing the volume of the secondary chamber 49, it is necessary to take into account these two factors of maximum container pressure and the volume of the secondary chamber 49 in calculating the "full" curve 60. In other words, the probable range of maximum positions of the hand 42 with different container pressures and different hose 33 must be determined. This probable range may either be calculated or determined empirically. Let us assume that this range of maximum readings would lie between fourteen and twenty-eight pounds per square inch. The two points on the outer scale 45 corresponding to these values are connected to the pivot point 43 by dotted lines 59 and 59a, as indicated in Fig. 4. A smooth curve is then drawn between the points at which the dotted lines 59 and 59a respectively intersect the content-indicating lines 51 and 58. This curve comprises a "full" calibration line 60 and may be of any desired curvature. I prefer to shape the calibration line 60 as shown in Figs. 3 to 5, inasmuch as such a shape facilitates the easy reading of the dial. The peripheral length of each of the content-indicating lines 51 to 58 inclusive is determined by the length of each of the lines between the "full" line 60 and a zero line 64. These peripheral lengths are divided into four equal segments and the points separating corresponding segments on each of the calibration lines are joined by smooth curves, these curves being termed calibration lines 61, 62, and 63. As will be noticed from Figs. 3, 4, and 5, these lines are lettered to indicate the fractional content of the container.

With such a dial, the operator makes his primary pressure tests as previously described, the line 47 being in a position indicated in Figs. 4 and 5. When the secondary reading is completed, the gage 41 will appear as indicated in Fig. 5. The operator at this time determines the point of intersection between the line 47 and the "full" calibration line 60. In the instance shown in Fig. 5, this intersection occurs directly over the point where the content-indicating line 56 intersects the full line 60. The operator then follows along the content-indicating line 56 with his eye to a point at which the hand 42 intersects this line, this intersection occurring at a point indicated by the numeral 65, of Fig. 5. This point of intersection 65 is located with respect to the calibration lines 60 to 63 inclusive, and by means of these lines the fractional content is determined. Thus, as indicated in Fig. 5, the point 65 lies directly on the line 62 which is marked "1/2", indicating that the container is half full and that one-half of the contents has been used. Should the point 65 fall at a point intermediate between the two calibration lines 62 and 63, such as at a point 65a, it is necessary to interpolate between the two adjacent calibration lines. Thus, the point 65a lies about midway between the calibration lines marked "1/4" and "1/2" so that the cylinder content would be between one-fourth and one-half and computed by interpolation would be three-eighths. This would indicate that the tank was three-eighths full and that five-eighths of the content originally stored in the container had been used.

It should be apparent that the indicia of my invention may be laid out to cover a wide difference in the maximum readings of the hand 42 instead of being limited to the range between fourteen pounds and twenty-eight pounds per square inch, as shown in the drawings. Furthermore, the manner in which the calibration lines 61, 62, and 63 are laid out may be different from that described.

The exact method described is only applicable to gages in which equal angular movements of the hand 42 throughout its path of travel indicate equal changes in pressure. Many gages at present on the market have calibrations which are slightly crowded near the zero line 64, in which case the peripheral distance on each content-indicating line would not be equally divided, but would be divided proportional to the scale divisions on the different parts of the dial, or by a cut-and-try or empirical method.

It should be understood that my invention is applicable to other apparatus than that described. Furthermore, my idea covers any means of allowing a given volume of gas at container pressure to expand into a larger volume, the pressure of this larger volume being recorded to give an indication of the amount of gas stored at the higher pressure. The indicia 50 of my invention are also applicable to other gages than the one type shown in the drawings. So, also, I am not limited to the use of the particular units shown in the drawings.

I claim as my invention:

1. A method of determining the gas content of a container, comprising: filling a primary chamber of known capacity with gas at container pressure; allowing the gas in said primary chamber to expand into a secondary chamber of a greater known capacity; and determining the pressure of said gas in said secondary chamber to determine the amount of gas in said container.

2. A method of determining the gas content of a container, comprising: filling a primary chamber at an initial time with gas at container pressure; allowing the gas in said primary chamber to expand into a secondary chamber, said gas in said secondary chamber then being at an initial pressure; measuring said initial pressure; at a subsequent time again filling said primary chamber with a gas at a subsequent container pressure; allowing said gas in said primary chamber and at such subsequent pressure to expand into said secondary chamber; and determining the then existing pressure of said gas in said secondary chamber, the ratio of said then existing pressure in said secondary chamber to said initial pressure in said secondary chamber being a measure of the amount of gas in said container at said subsequent time relative to the gas therein at said initial time.

3. In a device of the class described, the combination of: a gas container; walls forming a primary chamber of known capacity; means affording controllable communication between said chamber and the interior of said container; walls forming a secondary chamber of a different known capacity; means controlling the passage of said gas from said primary chamber into said secondary chamber; and means communicating with said secondary chamber and controlled by the pressure therein for indicating the fractional amount of gas stored in said container.

4. In a gage adapted to indicate the amount of gas under pressure in a container, the combination of: an indicating hand operable by gas from said container; and a dial adjacent said hand, said dial having thereon content-indicating lines extending parallel to the direction of movement of said hand at any point and calibration lines intersecting and dividing said content-indicating lines into segments proportional to the fractional gas content of said container.

5. In a gage adapted to indicate the amount of gas under pressure in a container, the combination of: an indicating hand operable by gas from said container; and a dial adjacent said hand, said dial having thereon content-indicating lines extending parallel to the direction of movement of said hand at any point and calibration lines intersecting and dividing each of said content-indicating lines into equal segments.

6. In a gage adapted to indicate the amount of gas under pressure in a container, the combination of: an indicating hand operable by gas from said container; a dial adjacent said hand, said dial having thereon content-indicating lines extending parallel to the direction of movement of said hand at any point and calibration lines intersecting and dividing said content-indicating lines into segments proportional to the fractional gas content of said container, the intersection of said hand when in a maximum position and the full calibration line determining the content-indicating line to be used on said container; and means for recording said intersection point of said hand and said "full" calibration line.

7. In a device of the class described, the combination of: a gas container; walls forming a primary chamber; means affording controllable communication between said chamber and the interior of said container; walls forming an addition to said primary chamber, said primary chamber and its addition together forming a secondary chamber; means for controlling the expansion of gas from said primary chamber into said secondary chamber; and means communicating with said secondary chamber and controlled by the pressure therein for ascertaining the quantity of gas stored in said container.

8. In a gage adapted to directly indicate the amount of gas under pressure in a container, the combination of: indicating means operable by gas from said container; and means having a plurality of segmentally divided indicia of different effective lengths forming a single scale adjacent which said indicating means operates.

9. In a gage adapted to directly indicate the amount of gas under pressure in a container, the combination of: indicating means operable by gas from said container; and means having thereon a plurality of content-indicating indicia and calibration indicia intersecting said content-indicating indicia, the several content-indicating indicia extending from a common zero line and being of different effective lengths.

10. In a gage adapted to directly indicate the amount of gas under pressure in a container, the combination of: indicating means operable by gas from said container; means having a plurality of segmentally divided indicia of different effective lengths adjacent which said indicating means operates; and means for recording the maximum position of said indicating means.

11. A method of determining the gas content of a container, comprising: filling a primary chamber of known capacity with gas at container pressure; allowing the gas in said primary chamber to expand into a secondary chamber including said primary chamber and of greater known capacity; and measuring the pressure of said gas in said secondary chamber to determine the amount of gas in said container.

12. A method of determining the gas content of a container, comprising: filling a primary chamber of known capacity with gas at container pressure; filling a secondary chamber of different known capacity with the gas from said primary chamber; and measuring the pressure of said gas in said secondary chamber to determine the amount of gas in said container.

In testimony whereof, I have hereunto set my hand at Denver, Colorado, this 23 day of November, 1927.

CHESTER MOTT.